United States Patent
Dewald et al.

(10) Patent No.: US 11,747,784 B2
(45) Date of Patent: Sep. 5, 2023

(54) OPTIMISATION OF CHIP REMOVAL PROCESSES ON MACHINE TOOLS

(71) Applicant: Siemens Aktiengesellschaft, Munich (DE)

(72) Inventors: Mario Dewald, Duisburg (DE); Alexander Ebben, Essen (DE); Timo Wullenkord, Duisburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/915,748

(22) PCT Filed: Feb. 19, 2021

(86) PCT No.: PCT/EP2021/054108
§ 371 (c)(1),
(2) Date: Sep. 29, 2022

(87) PCT Pub. No.: WO2021/197708
PCT Pub. Date: Oct. 7, 2021

(65) Prior Publication Data
US 2023/0120529 A1    Apr. 20, 2023

(30) Foreign Application Priority Data
Mar. 31, 2020    (EP) .................................... 20167182

(51) Int. Cl.
*G05B 19/402*    (2006.01)
(52) U.S. Cl.
CPC .. *G05B 19/402* (2013.01); *G05B 2219/31269* (2013.01)
(58) Field of Classification Search
CPC .................................................. G05B 19/402
See application file for complete search history.

(56) References Cited

U.S. PATENT DOCUMENTS 5,831,407 A * 11/1998 Ouchi .............. G05B 19/40937
318/568.25
6,445,959 B1 * 9/2002 Poth .................... G05B 19/418
700/71
(Continued)

FOREIGN PATENT DOCUMENTS

| CN | 109634238 A | * | 4/2019 | ....... G05B 19/41875 |
| CN | 110703713 A | * | 1/2020 | ....... G05B 19/41865 |

(Continued)

OTHER PUBLICATIONS

PCT International Search Report and Written Opinion of International Searching Authority dated Feb. 19, 2021 corresponding to PCT International Application No. PCT/E P2021/054108 filed May 14, 2021.

(Continued)

*Primary Examiner* — Ronald D Hartman, Jr.
(74) *Attorney, Agent, or Firm* — Henry M. Feiereisen LLC (57) ABSTRACT

In a method for operating a machine tool system with a machine tool for machining a workpiece using a tool, a control device is connected to the machine tool for generating a relative movement between the workpiece and the tool using a program executable by the control device. The control device includes an operating unit having a display device, allowing an operator to interact with the control device. The operator can manually alter with the operating unit a technology parameter. However, the operator generally does not know how a manual alteration of a technology parameter will affect productivity. Therefore, a measure for a change to production-related characteristics variable resulting from the manual alteration is determined and displayed to the operator on the display device directly or in relation to an associated relative measure.

13 Claims, 4 Drawing Sheets

(56) References Cited

U.S. PATENT DOCUMENTS

| | | | | |
|---|---|---|---|---|
| 6,957,121 | B2 * | 10/2005 | Lottgen | ................ G05B 19/409 700/173 |
| 7,457,715 | B1 * | 11/2008 | Bhateja | .............. G05B 23/0235 702/179 |
| 2009/0018781 | A1 | 1/2009 | Diezel et al. | |
| 2011/0202166 | A1 * | 8/2011 | Born | ................... G05B 19/4063 700/177 |
| 2012/0265330 | A1 | 10/2012 | Beck et al. | |
| 2016/0161936 | A1 * | 6/2016 | Lee | ...................... B23Q 15/013 700/173 |
| 2017/0212488 | A1 | 7/2017 | Kummer et al. | |
| 2019/0018391 | A1 | 1/2019 | Rogers et al. | |
| 2023/0023782 | A1 * | 1/2023 | Yun | ........................... H02P 5/74 |

FOREIGN PATENT DOCUMENTS

| | | | |
|---|---|---|---|
| DE | 10 2006 006 273 A1 | 8/2007 | |
| DE | 10 2009 023 648 A1 | 12/2010 | |
| EP | 1202143 B1 * | 6/2006 | ......... G05B 19/4093 |
| NL | 9320054 A * | 11/1995 | ......... G05B 19/4163 |
| WO | WO-2009037154 A2 * | 3/2009 | ......... G05B 19/4061 |
| WO | WO-2014200199 A1 * | 12/2014 | ........... B23Q 15/013 |

OTHER PUBLICATIONS

Lynch Mike: "Monitoring Important Control Panel Functions", p. 1, XP055733687, Gefunden im Internet: URL:https://www.mmsonline.com/columns/monitoring-important-control-panel-functions; 2011.

Loenzo Roberta Augusto Gomez et al: "An object-oriented architecture for sensorless cutting force feedback for CNC milling process monitoring and control"; Advances in Engineering Software, Elsevier Science, Oxford, GB, vol. 41, No. 5, pp. 754-761, XP026925736, ISSN: 0965-9978, DOI: 10.1016/J.Advengsoft.2009.12.016; 2010.

* cited by examiner

OPTIMISATION OF CHIP REMOVAL PROCESSES ON MACHINE TOOLS

CROSS-REFERENCES TO RELATED APPLICATIONS

This application is the U.S. National Stage of International Application No. PCT/EP2021/054108, filed Feb. 19, 2021, which designated the United States and has been published as International Publication No. WO 2021/197708 A1 and which claims the priority of European Patent Application, Serial No. 20167182.3, filed Mar. 31, 2020, pursuant to 35 U.S.C. 119(a)-(d).

BACKGROUND OF THE INVENTION

The invention relates to a method for operating a machine tool system, comprising a machine tool for machining at least one workpiece by means of at least one tool and a control apparatus connected to the machine tool for generating a relative movement between the workpiece and the tool using a program which can be executed by the control apparatus.

In the machining of a workpiece, for example in tool and mold construction, path programs (based on CNC) for controlling the respective machine, in particular milling machine, are generally used. Path programs (often also referred to as "part programs"; "CNC programs"; "control programs" or just "programs") are nowadays mainly generated by CAD/CAM/PP systems. The body or object to be produced is first designed with a CAD program (Computer Aided Design) and then translated by a CAM program (Computer Aided Manufacturing) into a machine-independent code which describes the processing sequence. A Post Processor (PP) translates the machine-independent code into a machine-dependent code, the so-called path program based on CNC, which can be used to actuate a specific machine. The machining is divided into different steps, for example into roughing, pre-finishing and finishing.

The path program produced in the manner described above in the CAD/CAM/PP system is then loaded onto the CNC controller of the relevant machine provided for machining the workpiece and is then executed by a machine operator on the machine by means of the CNC controller.

The path program, which may have been created in a CNC programming language (for example G code), is created in advance and no longer modified by the CNC controller at the time of processing. In particular, the machining technology, the tools to be used, the technology parameters (spindle speed, feed rate, cutting speed, etc.), the machine functions, the path curve to be followed by the respective tool and the respective tool orientation are specified in advance in the path program. The values determined in the path program are generally not requested by the CNC controller.

However, the operator on the machine is generally free to change certain parameters of the machining specified by the CNC program by actuating corresponding operating elements on an operating surface of the CNC controller. Such technology parameters which can be influenced by the machine operator are, in particular, the cutting speed, the feed rate, and the intervention depth or intervention width of the tool.

As a rule, the operator on the machine is not clear at the time of his manual intervention in the machining on how the specific parameter changes made affect productivity (the ratio between the added value created by machining and the resources expended for it).

From the publication Mike Lynch: "Monitoring Important Control Panel Functions", Jan. 17, 2011, pages 1-1, XP055733687, some buttons and switches of a CNC machine control panel, the functions of which should be known to an operator of a CNC machine, are mentioned. It is stated that, for example, a change in the feed override or the spindle override can have an effect on the machining speed and thus on the period of time required for a specific task.

From the publication US 2017/212488 A1, a system for monitoring and control of a central system is known, comprising a high-level optimizer, a subsystem monitor, a user interface and a graphic user interface (GUI). The central system comprises a plurality of subsystems which are configured for supplying thermal energy or as refrigeration systems. Through the interaction of a user, a period of time for filling an energy store can be determined and displayed.

From the publication DE 10 2009 023648 A1, it is known that in order to make it easier to operate a control system for a machine tool having a working space and machining units arranged therein, comprising a visualization controller which, based on operating data and based on a stored machine model on a visualization unit, displays the actual machine tool at least in the area of its working space by means of visualization elements as a virtual machine tool with virtual machining units provided in a virtual working space and their functions as virtual functions, the visualization unit is assigned an interaction unit which allows a manual interaction, the visualization unit is assigned a function selection unit which allows the assignment of a function of the machine tool to this manual interaction, and a function data generator unit is provided which generates corresponding operating data for manual interaction, taking into account the assigned function, and transmits this operating data to the visualization controller for display of the function specified by the manual interaction on the visualization unit by means of the visualization elements.

A system is known from the publication US 2019/018391 A1, comprising: one or more computers which are programmed in such a way that they generate an NC program (Numerical Control) to produce a workpiece using a CNC machine (Computer Numerical Control) and to provide output data for the production of the workpiece. The CNC machine is configured to execute the NC program to produce the workpiece and provide the output data, to encode the instructions of an additional computer program which is executed on the CNC machine, and which analyzes the output data before the production of the workpiece by the CNC machine is completed according to the instructions of the NC program. Furthermore, the CNC machine selects a data set from the analyzed output data based on one or more predetermined parameters and makes the data set available to a computer which is remote from the CNC machine in order to facilitate machining with the CNC machine. In this case, warning messages or suggestions for a feed override can also be output to an operator.

From the publication LOENZO RAG ET AL: "An object-oriented architecture for sensorless cutting force feedback for CNC milling process monitoring and control", ADVANCES IN ENGINEERING SOFTWARE, ELSEVIER SCIENCE, OXFORD, GB, Vol. 41, No. 5, May 1, 2010, pages 754-761, XP026925736, ISSN: 0965-9978, DOI: 10.1016/J.ADVENGSOFT.2009.12.016, a monitoring system for a ONG milling process is known which generates a feedback signal with respect to a cutting force. It is proposed that the cutting speed be selected in such a way that a compromise between minimum production costs and maximum productivity is achieved.

From the publication DE 10 2006 006 273 A1, a system for determining the state of wear of a machine tool is known. This has a machine tool with a controller, a production control computer, a tool database and a simulation computer connected to the controller of the machine tool, the production control computer and the tool database in each case via a data connection. This is intended to determine data describing the state of wear of the machine tool by means of a simulation process, taking into account actual machine, manufacturing and tool data of the machine tool, and to supply this data to a display unit or to a further process via a data connection.

During chip removal, according to the prior art, optimizations based on tool technologies are only carried out sequentially. This means that the optimization always takes place as a function of available internal and external experts and is therefore elaborate in terms of planning and personnel.

In addition the actual introduction and implementation of newly drafted processes or technologies is heavily dependent on the discipline of the employees and is therefore associated with enormous effort in the developing departments (manufacturing technology/industrial engineering) in terms of aftercare.

The challenge of this situation is based on the fact that no characteristic variables for the effectiveness of their own behavior are mirrored to the people working in the operational area.

A chip removal process depends on a multiplicity of circumstances. In particular, the costs of a specific process are heavily dependent on the friction pairing (cutting material/material) and the wear behavior of the tools resulting therefrom. There are currently no known productivity characteristic variables which would allow a comparative evaluation. Only the so-called chip removal rate is used repeatedly to assess productivity.

The task of the present invention is to give the machine operator feedback as to how the manual alterations of machining parameters undertaken by him on the machine affect productivity.

SUMMARY OF THE INVENTION

This object is achieved in a method for operating a machine tool system, comprising a machine tool for machining at least one workpiece by means of at least one tool and a control apparatus connected to the machine tool for generating a relative movement between the workpiece and the tool on the basis of a program which can be executed by the control apparatus, the control apparatus comprising an operating facility with a display apparatus for interaction between an operator and the control apparatus, in that by means of the operating facility, at least one technology parameter is altered manually by the operator and as a result a measure for a change to a production-related characteristic variable brought about by the alteration is determined and is displayed on the display apparatus directly and/or in relation to an associated relative measure.

Furthermore, this object is achieved by a corresponding machine tool system or a corresponding control apparatus for carrying out such a method.

The machine tool system for carrying out the method according to the invention comprises at least one machine tool for machining at least one workpiece by means of at least one tool. The machining is preferably a cutting process, such as a milling process. However, the invention is not limited to the latter, meaning that surface-treating processes (grinding, polishing, etc.) as well as additive manufacturing processes (for example 3D printing) are also included by it. Likewise, the term "machine tool" is to be interpreted broadly in connection with the invention, so that it also includes additive manufacturing machines or robots used in manufacturing. The machining itself can relate to a single workpiece. However, it can also relate to a multiplicity of workpieces, in particular a batch of workpieces, i.e. a series of workpieces which are machined in the same way.

Connected to the machine tool is a control apparatus, in particular a CNC controller, which executes a program, also referred to as a part program, path program, control program, etc. In particular, the trajectories executed by the tool relative to the workpiece are determined by the program.

The control apparatus in turn comprises an operating facility with a display apparatus for interaction between an operator and the control apparatus and in particular for manually setting or changing machining parameters. In particular by means of manual interaction, technology parameters such as spindle speed, feed rate, cutting speed, intervention depth or intervention width can be changed compared to the associated specifications. In particular, the feed rate can be varied directly in a range between 0 and 120% of the predetermined value in a very simple manner by rotating the override regulator which is customary in CNC controllers.

The technology parameters are usually defined by the control program. They are dependent on the machining to be carried out and the specific machine tool provided for this purpose. However, at least some of them can also be predefined by the respective machine tool and stored in the controller. In particular, for the spindle speed this is often the case.

The invention also provides that, as a result of at least one manual alteration of a technology parameter by the operator a measure for a change in a production-related characteristic variable brought about by the alteration, in particular a measure for a change brought about by the alteration of a machining time required for machining and/or a measure for a change brought about by the alteration of machining costs arising from machining is determined and in each case is displayed on the display apparatus directly and/or in relation to an associated relative measure. In particular, the invention provides that in order to determine the change in the production-related characteristic variable, in particular the machining time, not only is the pure chip removal time or main usage time recorded at which in particular the tool is in contact with the workpiece, but also the so-called idle times which accrue, for example, for a tool change. The machining time is thus the sum of main usage time and idle times.

The change in the machining time is advantageously specified in hours, minutes and seconds. However, other forms of representation are also conceivable, for example in the form of bars of a length or height corresponding to the change. An indication in % in relation to a relative measure is also possible.

Analogous to the machining time, the operator can also be shown a measure with regard to a change in the machining costs as a measure for a change in a production-related characteristic variable brought about by the alteration. These can also be displayed absolutely, for example in the form of an amount in a specific currency, or relative to a relative measure. An indication of how the parameter change affects the unit costs is also a possible variant of the invention.

The relative measure can result from an optimum of the machining to be carried out, but it can also relate to the values achieved during the preceding machining, to average values, etc. The optimum, in turn, can be a theoretical optimum which was determined, for example, in a simulation, or an optimum determined in comparable actual machining.

The change in the machining time is preferably determined on the basis of the service life of the tool, the friction pairing, and the time required for a tool change in each case. The service life of the tool, i.e. the period of time in which the tool for machining the workpiece is in contact (engagement) with the workpiece, is in turn generally dependent on the feed rate, the spindle speed and the friction pairing. The friction pairing specifies which cutting material—that is to say, the material of the cutting edges of the tool—applies to which material—that is to say, the material at the location of the workpiece to be machined in each case.

The change in the machining costs is preferably determined on the basis of the costs of the machine time ("machine hour rate") and the tool costs.

The invention offers the advantage that the operator on the machine, who changes at least one technology parameter through manual interaction by means of the operating facility, immediately receives feedback with regard to the effects of his actions with respect to a production-related characteristic variable, in particular the machining time and/or the machining costs. The operator immediately receives feedback regarding the effects of his actions. In particular, the operator can immediately recognize whether the intended effect can be achieved by his actions.

If, for example, the operator moves the feed rate from 100% to 120% by actuating the override controller, behind this often lies the expectation that machining will be carried out faster and the machining time reduced accordingly. As a result of the increased feed rate, however, tool wear will also be increased or the service life of the tool, in other words, the time for which the tool can execute the intended machining within the predefined wear limits, will be reduced. This may result in more tools being required for the machining to be carried out than originally calculated. Additional tool changes caused by this can lead to the reduction of the machining time being much less than originally intended, so that in the worst case the machining time (including the idle times) is even increased. The additional requirement for tools also has a negative effect on the machining costs arising from machining. As a result of the invention, the operator on the machine immediately recognizes that the desired effect may not be achieved with the manual intervention carried out by him. As a result, he has the opportunity to rethink the manual intervention and, if appropriate, not carry it out.

The advantages of the invention are shown in particular when workpieces which are highly labor-intensive, for example impellers, are milled or workpieces with high lot sizes are produced, Such machining often results in high tool wear and frequent tool changes caused by this. Since idle times, for example for tool changes, are also included in the machining time, such machining is subject to a high machining time. The alteration of a technology parameter on the machine can therefore have a significant impact on the number of tools required, as a result of which the machining time—and consequently, the machining costs—can change substantially.

Thus, in such machining-intensive machining operations, it is particularly important for the operator on the machine to immediately receive feedback on how manual interventions in machining affect production-related characteristic variables such as the machining time or the machining costs.

Advantageously, in connection with the invention, the degree of change in the respective production-related characteristic variable is determined by the control apparatus on the machine.

In addition, however, it is also possible to determine such calculations on a computing facility external to the control apparatus, for example an edge computer, a CAM system or in the cloud. These possibilities offer the advantage over the calculation on the control apparatus that the control apparatus is thus not subjected to additional computational effort.

In a preferred embodiment of the invention, the technology parameters changed by the manual interaction of the operator are not immediately implemented in the control apparatus. This means that the control apparatus initially continues to operate on the basis of the previously set parameters. Preferably, the change initially only has an effect in a simulation of machining with the altered parameter, Advantageously, the change in the production-related characteristic variable is likewise initially determined only on the basis of the simulation. As a result, the operator is given the option of first being shown the effects of the parameter changes before they actually change the actual machining carried out. The parameter change is also implemented only when the operator is clear about the effects caused by him in relation to the specific machining. For this purpose, renewed manual interaction between the user and the operating facility, for example pressing a confirmation button, is preferably required. Parameter changes which would have an unintended adverse effect on productivity can thereby be prevented in a timely manner.

In a preferred embodiment of the invention, a tool change time provided for the tool change, tool costs required for the procurement of a tool, or a machine hour rate intended for the operation of the machine tool are stored in the control apparatus or the external computing facility. Advantageously, the measure for a change to the production-related characteristic variable is then determined as a function of the tool change time, the tool costs or the machine hour rate.

By recording the tool change time, the tool costs and the machine hour rate, the variables with the greatest influence on the machining time or the machining costs are included in the calculation of the associated changes. The changes in question can be determined sufficiently precisely on the basis of these variables in particular.

The corresponding variables can be advantageously set by means of interaction between the user and the control apparatus or the external computing facility. This makes it possible to enter the corresponding variables into the system in a simple manner and to keep them up to date at all times.

The tool change time required for a tool change is also dependent on a multiplicity of parameters. For example, the size of the tool, the magazine location or the size of the relevant tool magazine can influence the tool change time. It is therefore particularly advantageous if the tool change time is measured during the actual operation of the machine and is preferably continuously updated. As a result, the tool change time is always up-to-date and a manual intervention by the user is not required for the update.

Advantageously, the production-related characteristic variable, in particular the machining time or the machining costs, or the change therein, is determined as a function of measured values generated during the operation of the machine tool system. In particular, these measured values relate to the service lives of the tools actually achieved during machining or the tool change time actually required for a tool change.

The technology parameters which can be changed manually by the operator and in which the effect of the manual change is displayed to the operator according to the invention are, in particular, the feed rate and the spindle speed. Experience has shown that these two technology parameters are most often changed manually by users on the machine. Thus, it is advantageous if, particularly in the case of these technology parameters, the effect of a change is immediately brought to the user's attention. However, the invention is not limited to these two technology parameters but can also relate to other or additional technology parameters.

In connection with the invention, it is important that the operator is not only shown the absolute value of the production-related characteristic variable such as the machining time or the machining costs because the effects of his manual intervention are not immediately apparent to him from these. It is much more important for the user to recognize how the relevant production-related characteristic variable changes as a result of his intervention.

Advantageously, the information is provided in relation to a relative measure. The relative measure is preferably an optimum, for example, the machining time required for machining or the machining costs arising from machining. The optimum can be a theoretical optimum which has been determined, for example, in a simulation of the machining process, in particular by means of a CAM system. However, the optimum can also be, for example, a value which has already been reached on the specific machine during an actual previous machining operation. As a result of the relation to a relative measure, in particular an optimum, the user immediately recognizes how strongly the manual intervention affects or would affect the ongoing machining in each case.

The dependence between the machining time or the chip removal rate and the feed rate, the intervention depth and the intervention width will be shown hereinafter by way of example in the chip removal of a chamber of an impeller.

Machining is carried out with a specific milling cutter from a specific manufacturer, which is present in a tool magazine of the relevant machine in the number required for machining.

For the exemplary chip removal of a chamber of an impeller with the specific milling cutter, the following provisions or specifications should apply:

| | |
|---|---|
| Cutting speed | $v_c$ = 180 m/min |
| Diameter | d = 66 mm |
| Number of teeth | Z = 4 |
| Feed rate | $v_f$ = 4000 mm/min |
| Intervention depth | $a_p$ = 0.7 mm |
| Intervention width | $a_e$ = 30 mm |
| Tool change time | t = 2 min |
| Machining volume | V = 40000 cm$^3$ |

Under these assumptions, the following variables can now be derived with the further assumption that no tool changes are required:

| | |
|---|---|
| Machining length | $l_f = V/(a_p + a_e)$ = 1905 m |
| Machining duration | $d_t = l_f * 1000/v_f$ = 476 min |
| Chip removal rate | Q = V/dt = 84 cm3/min |

The time for a tool change depends on the respective machine, in particular the tool magazine used and the tool changing apparatus. It can vary greatly from machine to machine and may also be subject to fluctuations in the same machine. These fluctuations can result, for example, from different magazine locations or depend on the respective position of the tool relative to the workpiece from which the relevant tool change must be carried out.

Assuming the following actual conditions, which are based in particular on measured values:

| | |
|---|---|
| Service life | T = 20 min |
| Tool change time | t = 2 min | it is thus possible to calculate the following variables:

Number of tool changes $A = dt/T = 24$

Base chip removal rate $Q_{base} = V/(dt + (t * A))$ $$= 76 \text{ cm3/min}$$

In the specific example, in the case of an (average) tool change time of 2 min and an (average) service life of the tool of 20 min, an actually achievable base chip removal rate $Q_{base}$ of approx. 76 cm$^3$/min is thus obtained.

The following tables are intended to illustrate how changes in the parameter feed rate, intervention depth or intervention width affect the chip removal rate or the base chip removal rate. In this case, the chip removal rate indicates the volume per time which undergoes chip removal without taking into account tool changes, whereas the tool change times are also taken into account in the specification of the base chip removal rate. In particular, each parameter change affects the service life of the tool, so that the number of tool changes required may change. Overall, in view of the relationships shown above, this results in the base chip removal rate shown in the tables.

| Feed rate $v_f$ [mm/min] | Machining time d [min] | Chip removal rate Q [cm$^3$/min] | Service life t [min] | Tool change A [piece] | Base chip removal rate $Q_{base}$ [cm$^3$/min] |
|---|---|---|---|---|---|
| 2000 | 952 | 42 | 80 | 12 | 41 |
| 2250 | 847 | 47 | 70 | 12 | 46 |
| 2500 | 762 | 53 | 60 | 13 | 51 |
| 2750 | 693 | 58 | 50 | 14 | 56 |
| 3000 | 635 | 63 | 40 | 16 | 60 |
| 3250 | 586 | 68 | 35 | 17 | 65 |
| 3500 | 544 | 74 | 30 | 18 | 69 |
| 3750 | 508 | 79 | 25 | 20 | 73 |
| 4000 | 476 | 84 | 20 | 24 | 76 |
| 4250 | 448 | 89 | 18 | 25 | 80 |
| 4500 | 423 | 95 | 16 | 26 | 84 |
| 4750 | 401 | 100 | 14 | 29 | 87 |
| 5000 | 381 | 105 | 12 | 32 | 90 |
| 5250 | 363 | 110 | 10 | 36 | 92 |
| 5500 | 346 | 116 | 8 | 43 | 92 |
| 5750 | 331 | 121 | 6 | 55 | 91 |
| 6000 | 317 | 126 | 4 | 79 | 84 |
| 6250 | 305 | 131 | 3 | 102 | 79 |
| 6500 | 293 | 137 | 2 | 147 | 68 |
| 6750 | 282 | 142 | 1 | 282 | 47 |
| 7000 | 272 | 147 | 0.5 | 544 | 29 |
| 7250 | 263 | 152 | 0 | | |
| 7500 | 254 | 158 | 0 | | |

-continued

| | | | | | |
|---|---|---|---|---|---|
| 7750 | 246 | 163 | 0 | | |
| 8000 | 238 | 168 | 0 | | |

| Intervention depth $a_p$ [mm] | Machining time d [min] | Chip removal rate Q [cm³/min] | Service life t [min] | Tool change A [piece] | Base chip removal rate $Q_{base}$ [cm³/min] |
|---|---|---|---|---|---|
| 0.5 | 667 | 60 | 40 | 17 | 57 |
| 0.55 | 606 | 66 | 35 | 17 | 62 |
| 0.6 | 556 | 72 | 30 | 19 | 68 |
| 0.65 | 513 | 78 | 25 | 21 | 72 |
| 0.7 | 476 | 84 | 20 | 24 | 76 |
| 0.75 | 444 | 90 | 18 | 25 | 81 |
| 0.8 | 417 | 96 | 17 | 25 | 86 |
| 0.85 | 392 | 102 | 16 | 25 | 91 |
| 0.9 | 370 | 108 | 15 | 25 | 95 |
| 0.95 | 351 | 114 | 14 | 25 | 100 |
| 1 | 333 | 120 | 13 | 26 | 104 |
| 1.05 | 317 | 126 | 12 | 26 | 108 |
| 1.1 | 303 | 132 | 11 | 28 | 112 |
| 1.15 | 290 | 138 | 10 | 29 | 115 |
| 1.2 | 278 | 144 | 10 | 28 | 120 |
| 1.25 | 267 | 150 | 10 | 27 | 125 |
| 1.3 | 256 | 156 | 10 | 26 | 130 |
| 1.35 | 247 | 162 | 9 | 27 | 133 |
| 1.4 | 238 | 168 | 9 | 26 | 137 |
| 1.45 | 230 | 174 | 8 | 29 | 139 |
| 1.5 | 222 | 180 | 7 | 32 | 140 |
| 1.55 | 215 | 186 | 6 | 36 | 140 |
| 1.6 | 208 | 192 | 5 | 42 | 137 |
| 1.65 | 202 | 198 | 4 | 51 | 132 |
| 1.7 | 196 | 204 | 3 | 65 | 122 |
| 1.75 | 190 | 210 | 2 | 95 | 105 |
| 1.8 | 185 | 216 | 1.2 | 154 | 81 |
| 1.85 | 180 | 222 | 0.8 | 225 | 63 |
| 1.9 | 175 | 228 | 0.4 | 439 | 38 |

-continued

| Intervention width $a_e$ [mm] | Machining time d [min] | Chip removal rate Q [cm³/min] | Service life t [min] | Tool change A [piece] | Base chip removal rate $Q_{base}$ [cm³/min] |
|---|---|---|---|---|---|
| 10 | 1429 | 28 | 30 | 48 | 26 |
| 12.5 | 1143 | 35 | 29 | 39 | 33 |
| 15 | 952 | 42 | 28 | 34 | 39 |
| 17.5 | 816 | 49 | 27 | 30 | 46 |
| 20 | 714 | 56 | 26 | 27 | 52 |
| 22.5 | 635 | 63 | 25 | 25 | 58 |
| 25 | 571 | 70 | 24 | 24 | 65 |
| 27.5 | 519 | 77 | 22 | 24 | 71 |
| 30 | 476 | 84 | 20 | 24 | 76 |
| 32.5 | 440 | 91 | 18 | 24 | 82 |
| 35 | 408 | 98 | 16 | 26 | 87 |
| 37.5 | 381 | 105 | 14 | 27 | 92 |
| 40 | 357 | 112 | 13 | 27 | 97 |
| 42.5 | 336 | 119 | 12 | 28 | 102 |
| 45 | 317 | 126 | 11 | 29 | 107 |
| 47.5 | 301 | 133 | 10 | 30 | 111 |
| 50 | 286 | 140 | 9 | 32 | 115 |
| 52.5 | 272 | 147 | 8 | 34 | 118 |
| 55 | 260 | 154 | 7 | 37 | 120 |
| 57.5 | 248 | 161 | 6 | 41 | 121 |
| 60 | 238 | 168 | 5 | 48 | 120 |
| 62.5 | 229 | 175 | 4 | 57 | 117 |
| 65 | 220 | 182 | 3 | 73 | 109 |

The service lives shown in the tables can, on the one hand, be based on information from the tool manufacturer, which provides information relating to certain cutting conditions (feed rate, intervention depth, intervention width) and certain materials of the workpiece. As a rule, however, these values are based on tests carried out on the machine with a specific workpiece.

As the tables show, changes in the feed rate, the intervention depth or the intervention width can lead to an increase in the base chip removal rate, They can also worsen this significantly, however.

As, in particular, the tool service life depends on all 3 parameters mentioned, it is a challenge for the machine operator to adjust these parameters in such a way that overall an optimum for machining, that is to say a maximum base chip removal rate, results.

Hereinafter, the effects on the manufacturing costs of an impeller as a function of the selected parameter settings will be explained by way of example. In this case, the machining takes place in a first process P1 with a base chip removal rate $Q_{base}$ of 60 cm³/min, a machining time of 667 min and a number of 17 tools required.

An optimized second process P2 is carried out with a base chip removal rate $Q_{base}$ of 100 cm³/min, a machining time of 400 min and a number of 25 tools required.

| Process | Base chip removal rate $Q_{base}$ [cm³/min] | Machining time d [min] | Number of tools A [piece] | Tool costs [€] | Machine cost rate [€/h] | Number of chambers [piece] | Impeller costs [€] |
|---|---|---|---|---|---|---|---|
| P1: | 60 | 667 | 17 | 50 | 208 | 13 | 41,094 |
| P2: | 100 | 400 | 25 | 50 | 208 | 13 | 34,277 |

As can be seen from the table, the optimized process P2 results in a cost saving of Euro 6,817 compared to the first process P1 per impeller.

BRIEF DESCRIPTION OF THE DRAWING

The invention is explained in more detail hereinafter with reference to exemplary embodiments. In the drawings.

DETAILED DESCRIPTION OF PREFERRED EMBODIMENTS

Figure 1:
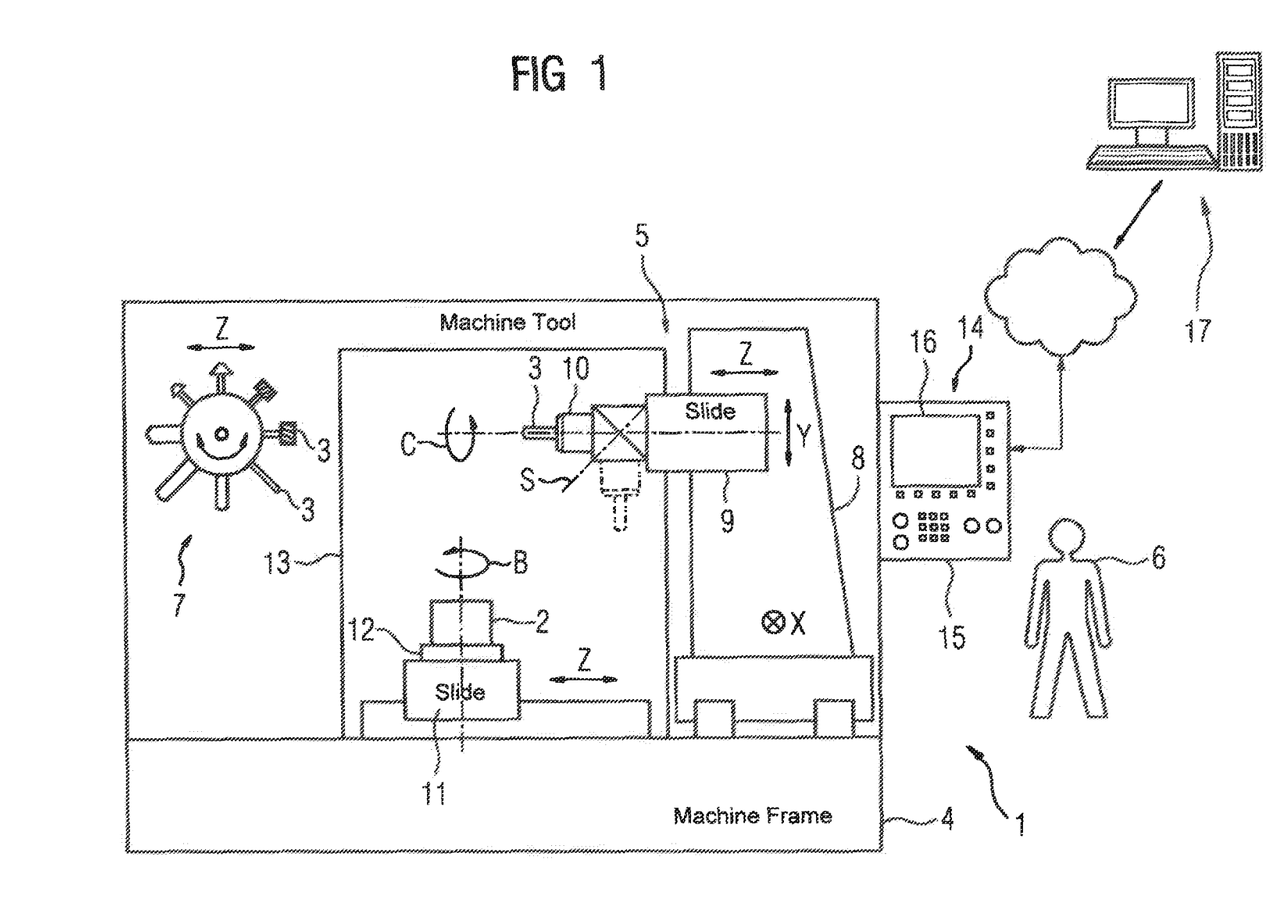
FIG. 1 shows a machine tool system with a numerically controlled machine tool.

FIG. 1 shows a diagrammatic view of a machine tool system according to the invention in the form of a machining center 1 for the 5-axis machining of a workpiece 2 by at least one tool 3. The machining center 1 comprises a machine tool 5 which is fastened to a machine frame 4. The machine tool 5 comprises a stand 8 which is movable along the axis X, and a slide 9 which is movably mounted thereon along the axes Y and Z, and which carries a spindle 10. The spindle 10 can be driven in rotation about the axis C and is provided for receiving a tool 3. Moreover, the spindle 10 is mounted so as to be pivotable about an axis S, the spindle axis C describing a movement on a conical surface during pivoting. The angle between the spindle axis C and the pivot axis S is 45°, resulting in a cone angle of 90°. As a result of this arrangement, the spindle 10 can assume any desired angle of inclination between a horizontal and a vertical extreme position.

The machine tool 5 further comprises a slide 11 which is movable along the axis Z and carries a workpiece table 12 which can be driven in rotation about the axis B and is provided with corresponding fastening and clamping means (not shown) for receiving a workpiece 2.

A CNC controller 14 is provided for controlling the machining center 1. The CNC controller 14 executes a control function by processing a part program in real time and thereby controls the relative movement between the tool 3 and the workpiece 2 in real time. In this case, input data or input signals ("actual values") of the machine tool 5 are continuously recorded by the controller 14, and the CNC controller 14 generates output signals in the form of control commands for the drives (not shown) of the machine tool 5, including these actual values.

The CNC controller 14 has, inter alia, as essential components a real-time kernel NCK (Numerical Control Kernel), a PLC (Programmable Logic Control) and an HMI unit 15 (Human-Machine Interface) with a display 16 for the operation of the machining center 1 by an operator 6.

The machining center 1 enables machining processes to be carried out by cutting technology with geometrically determined cutting edges, such as for example milling, turning, drilling, thread cutting, rotary milling, honing, etc., but also machining processes with geometrically undefined cutting edges, such as for example, grinding. Furthermore, chipless manufacturing methods such as roller burnishing or thread forming can be carried out. The production of a desired workpiece shape takes place within the working space 13 of the machine tool 5 by means of a sequence of different machining processes, for which tools 3 are moved with the workpiece 2 relative to one another along programmed paths and brought into engagement with one another. The tools 3 required for carrying out the machining processes are held in a tool magazine 7 and, in accordance with the machining sequence, are successively inserted into the spindle 10 by means of a tool changing facility (not shown).

With the machining center 1 shown, 5-axis machining operations can be carried out, which are required, for example, during the milling of free-form surfaces—for example, during the milling of turbine blades.

The controller 14 is designed such that initially predetermined technology parameters relating to the machining can be changed by manual actuation of the user interface 15 by the user 6. For example, a feed rate can be specified in a part program stored in the controller 14 and can be changed by the user 6 by actuating an override controller present at the user interface.

According to the invention, the effects of this change are first determined and displayed to the user in the form of a change in a production-related characteristic variable on the display 16 of the controller 14.

Figure 2:
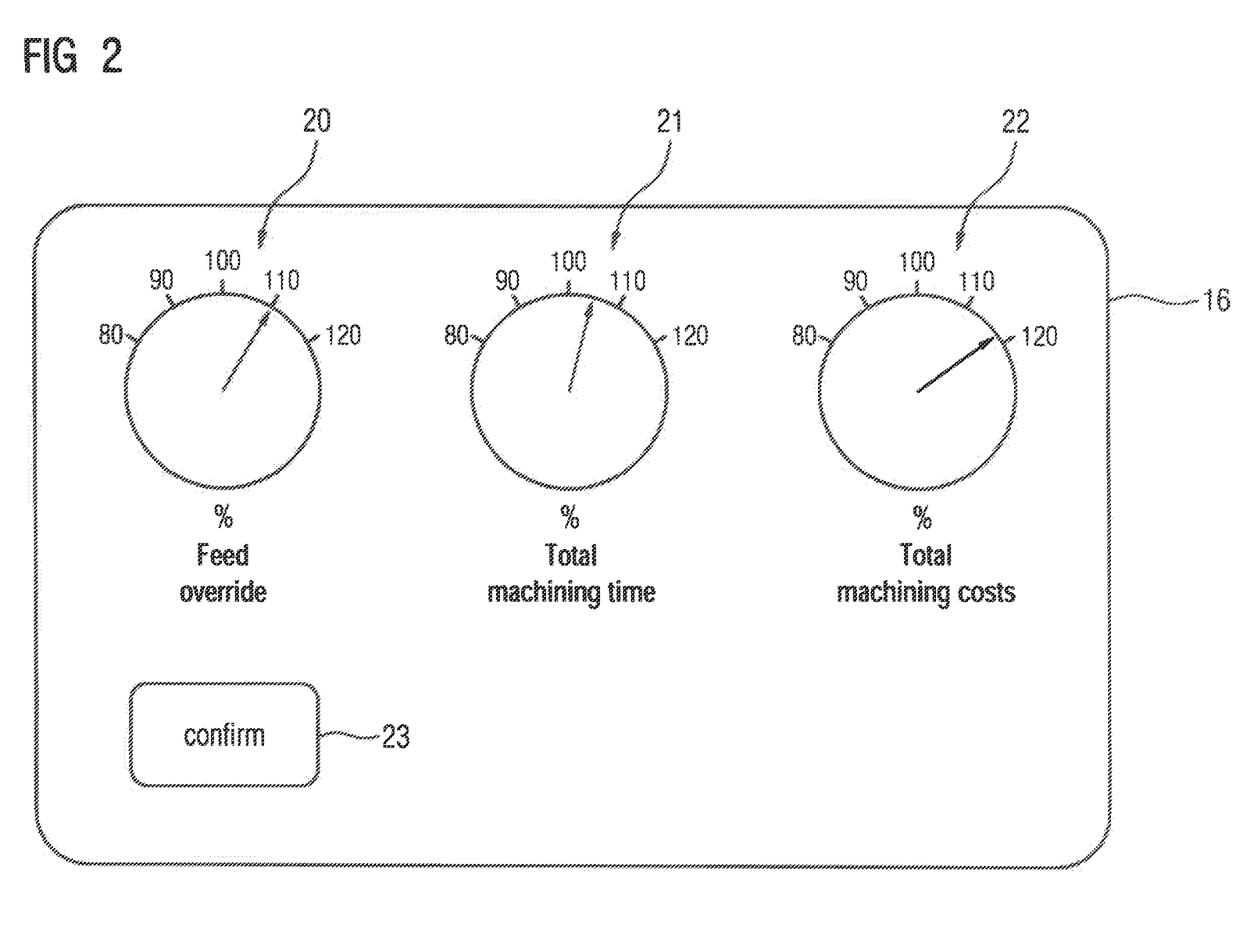
FIG. 2 shows a display according to the invention on a display of a user interface.

By way of example, FIG. 2 shows such a display on the display 16. In the example, the feed rate was increased from normal 100% to 120% (diagram 20). It can be seen from the display that this change in the feed rate would result in an increase in the total machining time to approx. 106% (diagram 21) and the total machining costs to approx. 119% (diagram 22). These initially unexpected effects can be explained, for example, by the fact that, during the intended machining, the tools used wear faster as a result of increasing the feed rate, which in turn causes a higher consumption of tools and increased, and more frequent, tool changes.

It is particularly advantageous if the manual change in a technology parameter, in the example the feed rate, does not have an immediate effect on the machining currently being carried out, but instead, for the implementation of the control function, the original value of the technology parameter is initially retained and the change in the production-related characteristic variable caused by the change is determined only in a simulation. The operator thus has the possibility of incorporating this feedback into his considerations and, if appropriate, not carrying out the change or carrying it out differently before anything at all changes with regard to the machining of the workpiece. For example, it is possible to prevent the user from inadvertently reducing the productivity of the machine by his manual intervention. In order that the manual parameter change performed actually affects the actual machining, in this exemplary embodiment, the "confirm" button 23 shown in FIG. 2 must first be actuated to confirm the change, for example by touching the button 23 on the display 16 embodied as a touch display.

Figure 3:
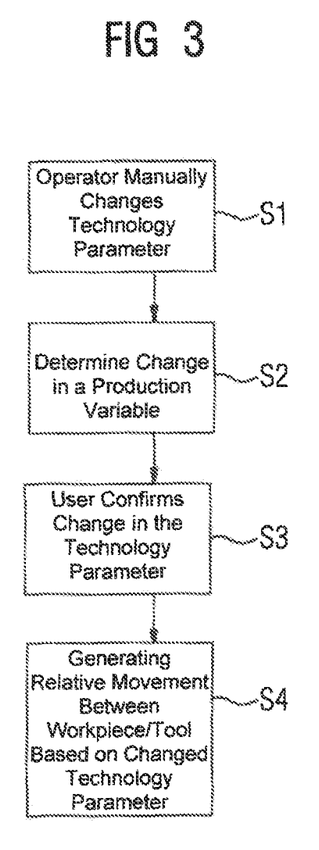
FIG. 3 shows method steps for carrying out a method according to the invention.

FIG. 3 illustrates an exemplary embodiment for carrying out a method according to the invention. In a first method step S1, by means of interaction between an operator and the control apparatus, the operator manually changes a specific technology parameter.

In a second method step S2, a measure of a change in a production-related characteristic variable caused by the change carried out in step S1 is determined and displayed on the display of the controller.

In a step S3, the user makes a further manual input to confirm the change in the technology parameter made in step S1.

In a step S4, the changed technology parameter in the control apparatus is taken into account when generating the relative movement between the workpiece and the tool.

Figure 4:
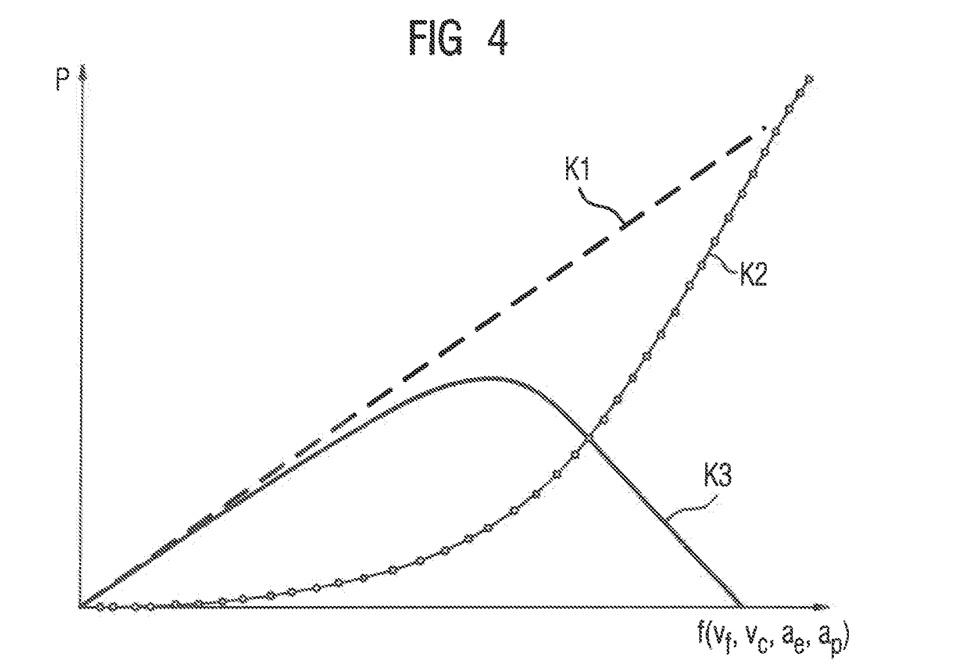
FIG. 4 shows productivity as a function of technology parameters.

FIG. 4 illustrates the relationship between production-related characteristic variable such as productivity and some technology parameters which can be changed by an operator on the machine tool (feed rate $v_f$, cutting speed $v_c$, intervention depth $a_p$ or intervention width $a_e$). The curve K1 (dashed line), in this case a straight line, illustrates the chip removal volume for the unrealistic application that no tool changes are required. The chip removal volume increases here, for example, in a linear manner with the feed rate.

The number of tool changes required for a specific actual machining operation is shown in the curve 2 (dotted line), Due to wear and tear, a disproportionately large number of tools are required as the chip removal volume of the tool in engagement increases.

The curve K3 illustrates productivity taking into account the wear-related tool change. It can be seen from this that productivity initially increases to an optimum with increasing chip removal volume (per unit of time) and decreases again after this optimum.

Figure 5:
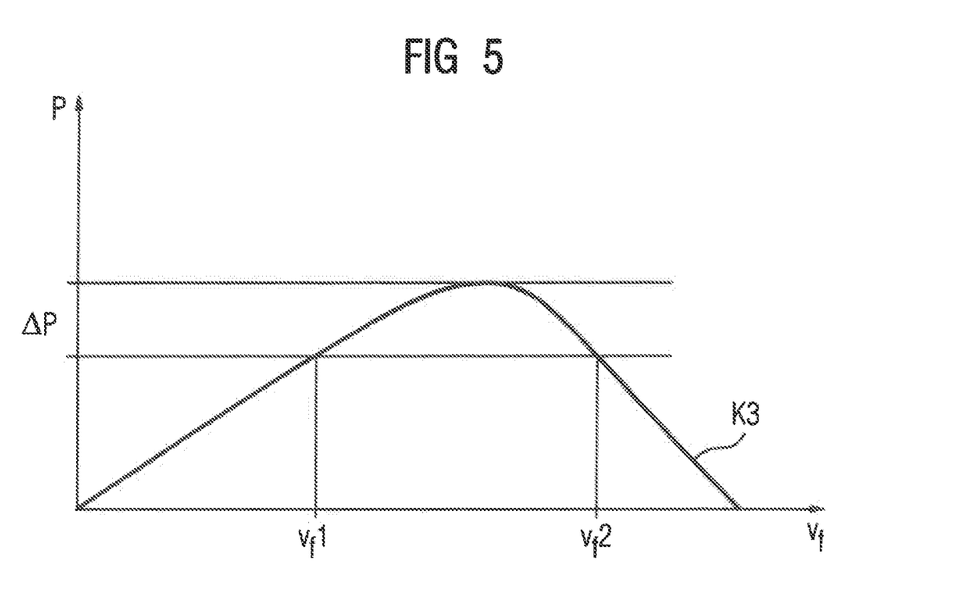
FIG. 5 shows a preferred operating range of the machine tool.

FIG. 5 illustrates, by way of example, a preferred range with regard to the feed rate $v_f$, which is preferably in a range between the values $v_f1$ and $v_f2$ and is thus determined in such a way that the productivity P deviates from its maximum at most by a predetermined value ΔP. The operator preferably receives an additional warning message on the machine if the machine is located at an operating point outside the preferred operating range defined in this way.

On the basis of the procedure proposed here, the employee who determines the process receives business data relevant to the process which supports him in his decision-making. Although the non-linear dependencies are still present in the process, decisions made in the past, for example, are clearly mirrored to the employee with regard to the mode of action, so that he can better make the upcoming decisions.

The invention leads to an incremental improvement of the processes and has considerable potential in terms of savings, increased effectiveness and optimization of the cost situation.

On the basis of such an online process evaluation, it is even possible to optimally adjust the processes to the current utilization situation, for example by specifying a guideline or an abstract target variable (for example, TCO/base chip removal rate).

What is claimed is:

1. A method for operating a machine tool system, the machine tool system comprising a machine tool with a tool for machining a workpiece, and a control apparatus connected to the machine tool for generating a relative movement between the workpiece and the tool using a program which can be executed by the control apparatus, with the control apparatus comprising an operating facility with a display apparatus for interaction between an operator and the control apparatus, said method comprising:
   altering manually by the operator using the operating facility a technology parameter;
   determining a change to a production-related characteristic variable brought about by the altered technology parameter;
   displaying the changed production-related characteristic variable on the display apparatus directly or in relation to an associated relative measure;
   determining the changed production-related characteristic variable with the control apparatus or with an external computing facility connected to the control apparatus;
   storing in the control apparatus or in the external computing facility a tool change time provided for a tool change or tool costs required for procuring the tool or a machine hour rate associated with operating the machine tool; and
   determining a measure for the change to the production-related characteristic variable as a function of at least one of the tool change time, the tool costs and the machine hour rate.

2. The method of claim 1, further comprising:
   employing for machining the workpiece or for machining a batch of the workpiece a number of identical tools, with the number of identical tools changing as a result of the manual alteration of the technology parameter;
   successively inserting with a tool changing apparatus the tools into a tool holder of the machine tool; and
   determining the change in the production-related characteristic variable as a function of the number of tools and a number of tool changes associated therewith.

3. The method of claim 1, further comprising after the measure for the change to the production-related characteristic variable is displayed on the display apparatus, requiring a further manual interaction of the operator with the operating facility before the machining of the workpiece is adapted to the altered technology parameter.

4. The method of claim 1, wherein at least one of the tool change time, the tool costs and the machine hour rate can be adjusted by interaction between the operator and the control apparatus or the external computing facility.

5. The method of claim 1, wherein the tool change time is measured and preferably continuously updated during the actual operation of the machine tool.

6. The method of claim 1, wherein the measure for the change to the production-related characteristic variable is determined as a function of measured values generated during the operation of the machine tool.

7. The method the claim 1, further comprising manually changing a feed rate or a spindle speed by the operator.

8. The method of claim 1, wherein the measure for the change to the production-related characteristic variable is displayed as an absolute value.

9. The method of claim 1, wherein the measure for the change to the production-related characteristic variable is displayed relative to an optimum of the relevant production-related characteristic variable.

10. The method of claim 1, wherein the production-related characteristic variable is a machining time necessary for machining the workpiece or machining costs associated with machining the workpiece.

11. A machine tool system, comprising:
   a machine tool with a tool for machining a workpiece; and
   a control apparatus connected to the machine tool for generating a relative movement between the workpiece and the tool, said control apparatus comprising an operating facility with a display apparatus for interaction between an operator and the control apparatus, said control apparatus, by using a program which can be executed by the control apparatus, configured to
   alter manually by the operator using the operating facility a technology parameter,
   determine a change to a production-related characteristic variable brought about by the altered technology parameter,
   display the changed production-related characteristic variable on the display apparatus directly or in relation to an associated relative measure,
   determine the changed production-related characteristic variable with the control apparatus or an external computing facility connected to the control apparatus,
   store in the control apparatus or in the external computing facility a tool change time provided for a tool change or tool costs required for procuring the tool or a machine hour rate associated with operating the machine tool, and
   determine a measure for the change to the production-related characteristic variable as a function of at least one of the tool change time, the tool costs and the machine hour rate.

12. The machine tool system of claim 11, wherein the external computing facility determines a measure for a machining time required for machining the workpiece or a measure for machining costs associated with machining the workpiece.

13. A control apparatus for a machine tool system having a machine tool with a tool for machining a workpiece, the control apparatus connected to the machine tool for generating a relative movement between the workpiece and the tool, and comprising an operating facility with a display apparatus for interaction between an operator and the control apparatus, the control apparatus, by using a program which can be executed by the control apparatus, configured to alter manually by the operator using the operating facility a technology parameter, determine a change to a production-related characteristic variable brought about by the altered technology parameter, display the changed production-related characteristic variable on the display apparatus directly or in relation to an associated relative measure, determine the changed production-related characteristic variable with the control apparatus or an external computing facility connected to the control apparatus, store in the control apparatus or in the external computing facility a tool change time provided for a tool change or tool costs required for procuring the tool or a machine hour rate associated with operating the machine tool, and determine a measure for the change to the production-related characteristic variable as a function of at least one of the tool change time, the tool costs and the machine hour rate.

* * * * *